(12) United States Patent
Hawley et al.

(10) Patent No.: US 9,753,470 B1
(45) Date of Patent: Sep. 5, 2017

(54) ADAPTIVE HEADROOM CONTROL TO MINIMIZE PMIC OPERATING EFFICIENCY

(71) Applicant: Maxim Integrated Products, Inc., San Jose, CA (US)

(72) Inventors: Steven Westcott Hawley, Emerald Hills, CA (US); KyungTak Lee, Seoul (KR); ChiYoung Kim, Cupertino, CA (US); Rui Liu, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 20 days.

(21) Appl. No.: 14/014,772

(22) Filed: Aug. 30, 2013

Related U.S. Application Data

(60) Provisional application No. 61/841,093, filed on Jun. 28, 2013.

(51) Int. Cl.
*G05F 1/46* (2006.01)
*H02M 1/00* (2006.01)

(52) U.S. Cl.
CPC ....... *G05F 1/462* (2013.01); *H02M 2001/008* (2013.01)

(58) Field of Classification Search
CPC .... H02M 2001/008; H02M 2001/0045; G05F 1/462
See application file for complete search history.

(56) References Cited

U.S. PATENT DOCUMENTS

| | | | |
|---|---|---|---|
| 9,088,176 B2* | 7/2015 | Hendin | ........ H02J 1/08 |
| 2004/0233144 A1* | 11/2004 | Rader | ........ G09G 3/342 345/82 |

(Continued)

OTHER PUBLICATIONS

Maxim Integrated Products, Inc. Datasheet for MAX6948B, "High-Efficiency PWM LED Driver with Boost Converter and Five Constant-Current GPIO Ports," 19-4935, Rev 0, Sep. 2009, 28pgs.

(Continued)

*Primary Examiner* — Jue Zhang
*Assistant Examiner* — Lakaisha Jackson
(74) *Attorney, Agent, or Firm* — North Weber & Baugh LLP

(57) ABSTRACT

Various embodiments of the invention provide for an adaptive headroom controller circuit that increases the efficiency of switch mode pre-regulator circuits that supply power to multiple linear sub-regulators. Certain embodiments increase efficiency by dynamically modulating the output voltage of the pre-regulator in response to varying headroom voltages requirements, which allows sub-regulators to operate at their individually optimized headroom voltage, thereby, extending battery life and, at the same time, avoiding the triggering of a drop-out condition.

In certain embodiments of the invention, further efficiency improvements are provided by selectively operating low drop-out regulators in regulator and load-switch mode. The innovation is applicable to modern mobile PMIC switching pre-regulator architectures (e.g., buck, buck/boost, or boost type) powered by a single high-voltage Li-ion battery and followed by a group of low drop-out type sub-regulators that share a common, pre-regulated low voltage input that drives multiple low-voltage outputs.

19 Claims, 4 Drawing Sheets

(56) References Cited

U.S. PATENT DOCUMENTS

| | | | |
|---|---|---|---|
| 2006/0033481 A1* | 2/2006 | Thiele | G05F 3/262 323/266 |
| 2009/0140868 A1* | 6/2009 | Booth | G08B 17/10 340/628 |
| 2010/0194308 A1* | 8/2010 | Zhao | H05B 33/0815 315/297 |
| 2011/0169423 A1* | 7/2011 | Huang | H05B 33/0815 315/297 |

OTHER PUBLICATIONS

Texas Instruments Incorporated, Datasheet for TPS54900, "Programmable Four-Channel Step-Down DC/DC Converter," 2001, 15pgs.

* cited by examiner

ADAPTIVE HEADROOM CONTROL TO MINIMIZE PMIC OPERATING EFFICIENCY

CROSS REFERENCE TO RELATED PATENT APPLICATIONS

The present application claims priority to U.S. Provisional Application Ser. No. 61/841,093, titled "Adaptive Headroom Control to Maximize PMIC Operating Efficiency," filed on Jun. 28, 2013 by Stephen W. Hawley, KyungTak Lee, ChiYoung Kim, and Rui Liu which application is hereby incorporated herein by reference in its entirety.

BACKGROUND

A. Technical Field

The present invention relates to linear regulators and, more particularly, to systems, devices, and methods of improving operating efficiency of linear regulators through adaptive headroom control.

B. Background of the Invention

In order to maximize efficiency of linear regulators, it is desirable to operate at the lowest possible input voltage since, for a given linear regulator output current, the efficiency of a linear regulator is a function of its output voltage divided by the input voltage. However, reducing the input voltage of a linear regulator below its drop-out voltage results in poor output regulation and/or noise performance.

Some existing designs utilize a pre-regulator that is coupled between a relatively high voltage power source and a relatively low linear regulator output voltage in order to reduce the input voltage of the low voltage regulator relative to its output voltage in order to avoid the degradation of efficiency associated with high regulator input voltages.

In particular, PMIC in architectures with multiple low-dropout linear regulators (LDO) that operate loads requiring differing power levels LDOs are oftentimes grouped together and coupled to the common output of a single pre-regulator. For example, a number of regulators that are designed to provide an output voltage of around 1.5 V are grouped together and driven from the same voltage rail and by the same output voltage of a pre-regulator. The pre-regulator output voltage is typically preset to a fixed, maximum value required by any linear regulator within the group in order to avoid drop-out conditions.

In addition, the minimum required headroom for each LDO regulator is taken into account to formulate a worst-case system voltage requirement, which is typically equal to the sum of the programmed pre-regulator output voltage and the highest headroom voltage requirement within the group of LDO regulators. The headroom serves as a safety margin that accounts for expected variations encountered during regular operation.

However, even when PMICs drive each group of LDO regulators with a dedicated pre-regulator, such open-loop topologies use static headroom settings that are characterized by larger than necessary headroom margins and input voltages for the majority of the LDO regulators within the group and, therefore, negatively impacts system efficiency. What is needed are tools for system designers to overcome the above-mentioned limitations.

SUMMARY OF THE INVENTION

In various embodiments of the invention, an adaptive headroom control circuit initializes and controls a pre-regulator in a manner so as to maintain a minimum output voltage that the pre-regulator supplies to a group of linear regulators. In particular, the pre-regulator output voltage is determined by the linear regulator with the highest input voltage requirement within a group of regulators. In this way, the pre-regulator satisfies a worst-case operating headroom voltage requirement for each regulator under varying operating conditions.

The adaptive headroom control circuit achieves this in certain implementations by monitoring and adaptively minimizing the input voltages of the linear regulators utilizing a combination of analog, digital circuitry, and/or software methods. Minimizing comprises identification of headroom voltages for linear regulators and selection of the highest of the input voltages while maintaining a minimum dropout voltage common to all linear regulators within the group. The linear regulator which determines the pre-regulator output voltage is referred to as the "master" sub-regulator. The control circuit dynamically adjusts the pre-regulator output voltage as determined by the master sub-regulator operating conditions (output voltage, output load, temperature, etc.). In addition, the selection of a master sub-regulator is determined dynamically by the operating conditions of all identified sub-regulators (output voltage, output load, temperature, etc.). In this way, the control system implements an entirely adaptive headroom control mechanism.

Headroom voltages are adjusted in response to varying operating conditions, including on/off states of the linear regulator, device-to-device headroom voltage variations, die temperature, output noise, and output load variations. This causes the minimum dropout voltage and the pre-regulator output voltage to dynamically adjust to the operating conditions.

Various embodiments allow the linear regulators to transition between a regulator mode and a load-switch mode. This further reduces the dropout voltage to about zero Volts when the output voltage noise of the master linear regulator is met and all non-master linear regulators headroom voltages are met. The linear regulators transition back to regulator mode is made when these conditions are no longer satisfied.

Certain features and advantages of the present invention have been generally described here; however, additional features, advantages, and embodiments presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
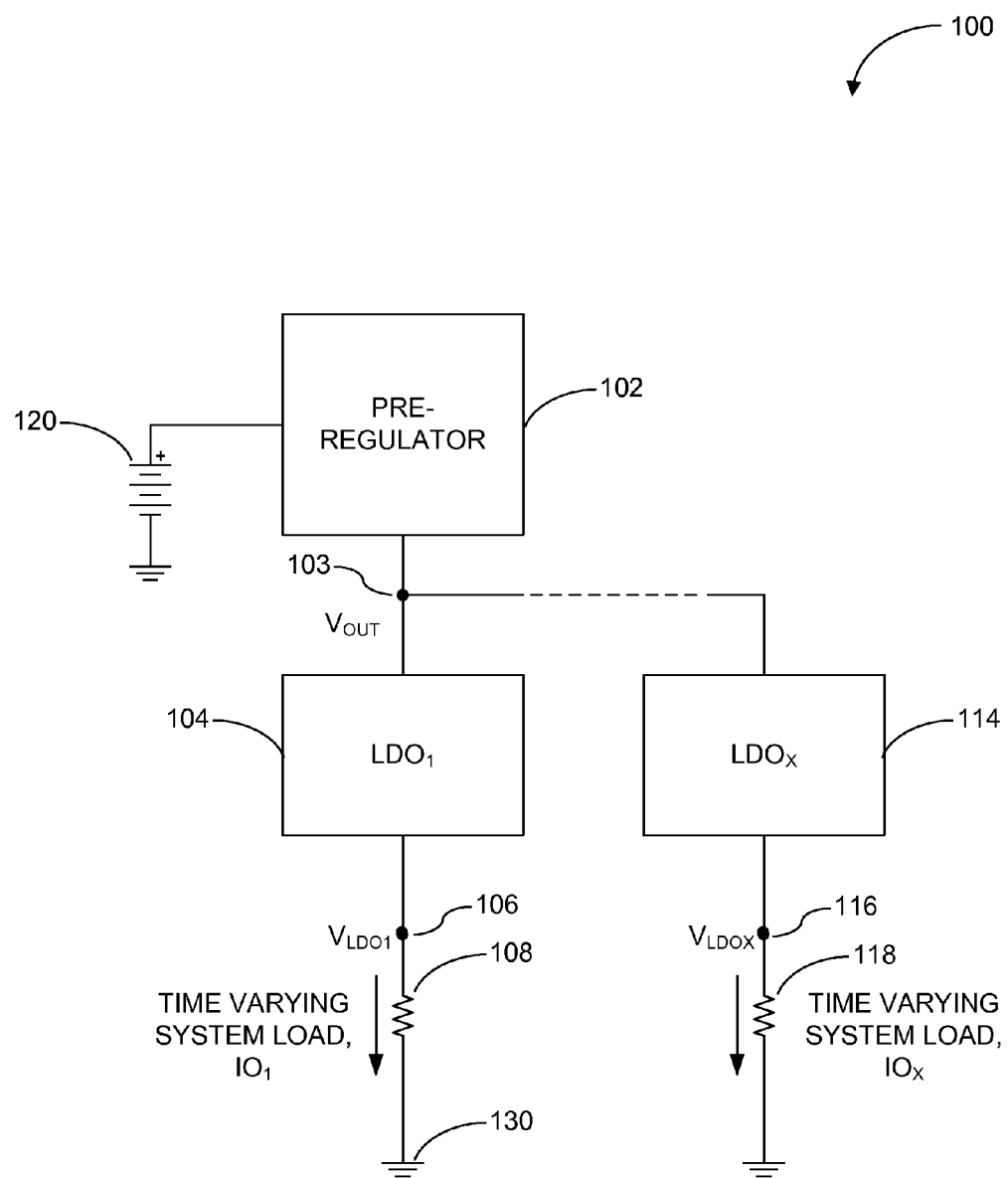
FIG. 1 illustrates a prior art illustrates a prior art regulator system utilizing a pre-regulator that supplies power to multiple sub-regulators.

FIG. 1 illustrates a prior art regulator system utilizing a pre-regulator that supplies multiple low drop-out sub-regulators. System 100 comprises battery 120, pre-regulator 102, Sub-regulator 1 104, Sub-regulator X 114, voltage output node 106, 116, and load 108, 118. Typically, pre-regulator 102 is a switching regulator with an external inductor rather than a linear regulator. In this example, pre-regulator 102 is a buck switching regulator that receives a DC voltage from battery 120 and converts it into a lower output voltage 103. LDO1 104 is a low drop-out regulator that receives output voltage 103 and converts it to an even lower output voltage 106 that drives load 108. Similarly, LDO2 114 converts the same output voltage 103 into another low output voltage 116 that drives load 118, which is a time-varying system load.

Sub-regulator 1 104 and Sub-regulator X 114 form a group that is connected to the common output voltage 103 of pre-regulator 102. Sub-regulator 1 104 and Sub-regulator X 114 may be used to operate different voltage rails, e.g., a 2.5 V-3.5 V battery voltage rail and a 1 V-2 V low voltage rail. Output voltage 103 of pre-regulator 102 is set to the higher voltage requirement of Sub-regulator 1 104 and Sub-regulator X 114 to protect against drop-out of the Sub-regulators, where the output voltage would fall below the specified minimum voltage. Output voltage 103 of pre-regulator 102 is then set to that higher value plus a headroom value of, e.g., 300 mV to provide each Sub-regulator with an output voltage of 1.5V with an input voltage of 1.8 V. This worst-case voltage is intended to account, such as device-to-device variations in the manufacturing process of the devices, maximum operating temperatures, output noise, and the expected maximum load condition, which all may disadvantageously contribute to the 300 mV variation in headroom voltage.

Since, as mentioned in the Background section, the efficiency of a linear regulator is a function of its output voltage divided by its input voltage, at constant input and output currents, it is desirable to operate Sub-regulator 1 104 through Sub-regulator X 114 at their lowest possible input voltage, i.e., the lowest possible common pre-regulator output voltage 103, so as to maximize the efficiency of system 100. However, since the actual lowest possible input voltage is not constant, but rather a function of the above-mentioned factors, some portion of the efficiency is always sacrificed in pre-regulator 102 that operate at a constant programmed to output voltages. Therefore, it would be desirable to automatically adjust the headroom to the actual, varying headroom requirements in order to increase circuit efficiency and extend battery life of battery 120.

Figure 2:
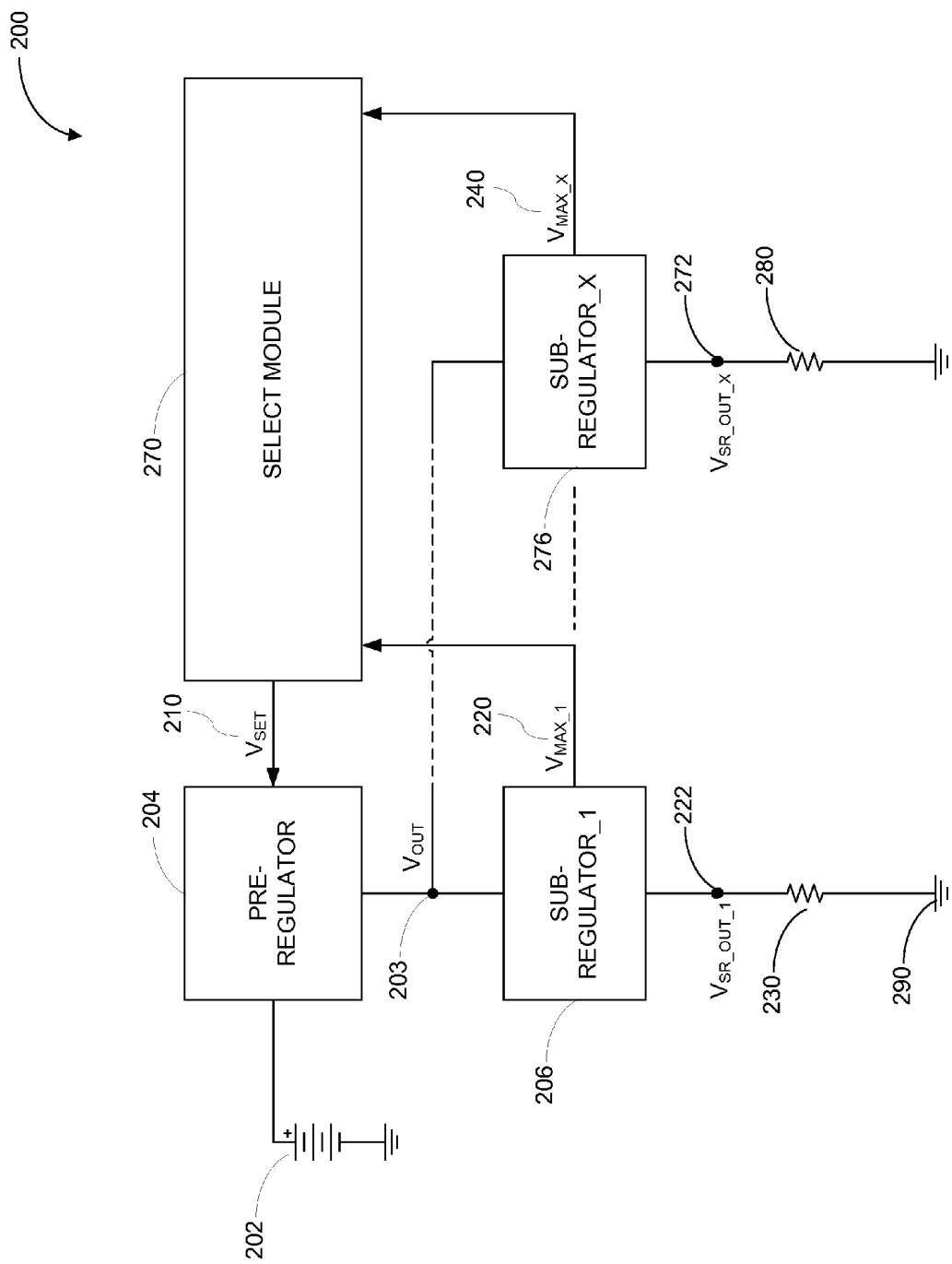
FIG. 2 is a general illustration of an adaptive headroom control system utilizing a pre-regulator and a combination of analog, digital circuitry, and/or software control, according to various environment of the invention.

FIG. 2 is a general illustration of an adaptive headroom control system utilizing a pre-regulator and a combination of analog, digital circuitry, and/or software control, according to various environment of the invention. System 200 comprises power supply 202, pre-regulator 204, sub-regulator 1 206, sub-regulator X 276, load 290, and select module 270. Pre-regulator 204 is any switching regulator, e.g., a buck converter, a boost converter, or a buck-boost converter. Sub-regulator 206, 276 is coupled to pre-regulator 204 and may comprise any linear regulator known in the art, such as a low drop-out regulator. Sub-regulator 206, 207 is coupled to load 230, 280 and to select module 270. Load 230, 280 may be any time-varying system load, such as microcontroller chip.

In operation, pre-regulator 204 receives a DC voltage from power supply 202 and converts it to a different output voltage 203, e.g., based on initial settings or in response to control signal $V_{SET}$ 210. Sub-regulator 206 converts output voltage 203 into a relatively lower output voltage 222 that drives load 230. Similarly, sub-regulator 276 converts output voltage 203 to low output voltage 272 to drive load 280. Sub-regulator 276 generates voltage signal $V_{MAX_1}$ 220, which is representative of the maximum input voltage requirement of sub-regulator 206. As shown in FIG. 2, select module 270 receives voltage signal $V_{MAX_j}$ 220, 214 from sub-regulator 206, 276. From this, select module 270 determines which sub-regulator 206, 276 has the highest voltage requirement, for example, by selecting the highest value of voltage signals $V_{MAX_j}$ 220, 214, at any moment in time. If the output of sub-regulator 1 206 is set, e.g., at 1.6 V with 100 mV of headroom and the output of sub-regulator X 276 is set at 1.5 V with 300 mV of headroom, select module 270 would select the latter value and output that value as control signal 210, which pre-regulator 204 then uses to adjust output voltage $V_{OUT}$ 203. In one embodiment, system 200 comprises analog and digital circuit components coupled in a closed loop circuit configuration to continuously monitor the actual output voltage 222, 272 of sub-regulator 206, 207 in order to effectively control output voltage 203 of pre-regulator 204.

In practice, the actual output voltage $V_{SR\_OUT\_N}$ of each sub-regulator 206, 276 is affected by on/off state of the sub-regulator, output loads, die temperature of the group of sub-regulators, source voltage 202, output noise requirements (e.g., derived from input and output specifications of system 200), etc. Therefore, a headroom voltage should be built into voltage signal $V_{MAX\_N}$ 220, 240 in order to account for these variations. As a result, select module 270 should take into account an overall headroom margin that is a function of the actual output voltages $V_{SR\_OUT\_N}$, such that output voltage 203 of pre-regulator 204, i.e., the input voltage to each sub-regulator 206, 276 changes dynamically and relatively rapidly (e.g., within microseconds) as dictated by the headroom requirement. In this way, pre-regulator 204 ensures that a sufficiently high output voltage 203 is provided to all sub-regulators 206, 276. Ideally, pre-regulator 204 maintains a minimum dropout voltage for sub-regulators 206, 276 under all dynamic operating conditions.

In one embodiment, the maximum input voltage requirement for each sub-regulator 206, 276 is regularly updated at predetermined intervals or conditions in order to further increase efficiency. Updates may depend on predetermined events, such as a start-up event, or how often output load 230, 280 changes over time.

In one embodiment, when the actual output voltage $V_{SR\_OUT\_N}$ of each sub-regulator 206, 276 is unknown, select module 270 may receive a set output voltage value $V_{SR\_OUT\_N}$ 222, 272 for each sub-regulator 206 and 276 within a sub-group of sub-regulators. Select module 270 then compares values $V_{SR\_OUT\_N}$ and determines the sub-regulator with the highest set voltage value therefrom and outputs that value as control signal $V_{SET}$ 210.

In one embodiment, output voltage values $V_{SR\_OUT\_N}$ 222, 272 may be determined using software to read out registers read one or more settings of programmable registers (not shown) and employing digital comparators to compare the register settings for each sub regulator 206, 276 to determine the sub-regulator with the highest output voltage value setting, such that pre-regulator 204 can be set appropriately to meet the headroom and voltage requirement for sub-regulator 206, 276.

In one embodiment, sub-regulator 206, 276 transitions between "linear regulator mode" and "load switch mode." This further reduces the dropout voltage to about zero Volts when the output voltage noise and other factors of the master linear regulator is met and all non-master linear regulators' maximum input voltages are met. Transition back to regulator mode is made when these conditions are no longer met. If any sub-regulators defined as master are able to utilize the direct pre-regulator output voltage, while all other (non-master) sub-regulators' maximum input voltage is met, then the master output voltage is set equal to the master input voltage. In this case, master sub-regulator 206, 276 can be replaced with a load switch that in its on-state is ideally a zero Ohm switch. This load switch can transition, as needed, into a sub-regulator and back to a load switch, as required by the controller.

Figure 3:
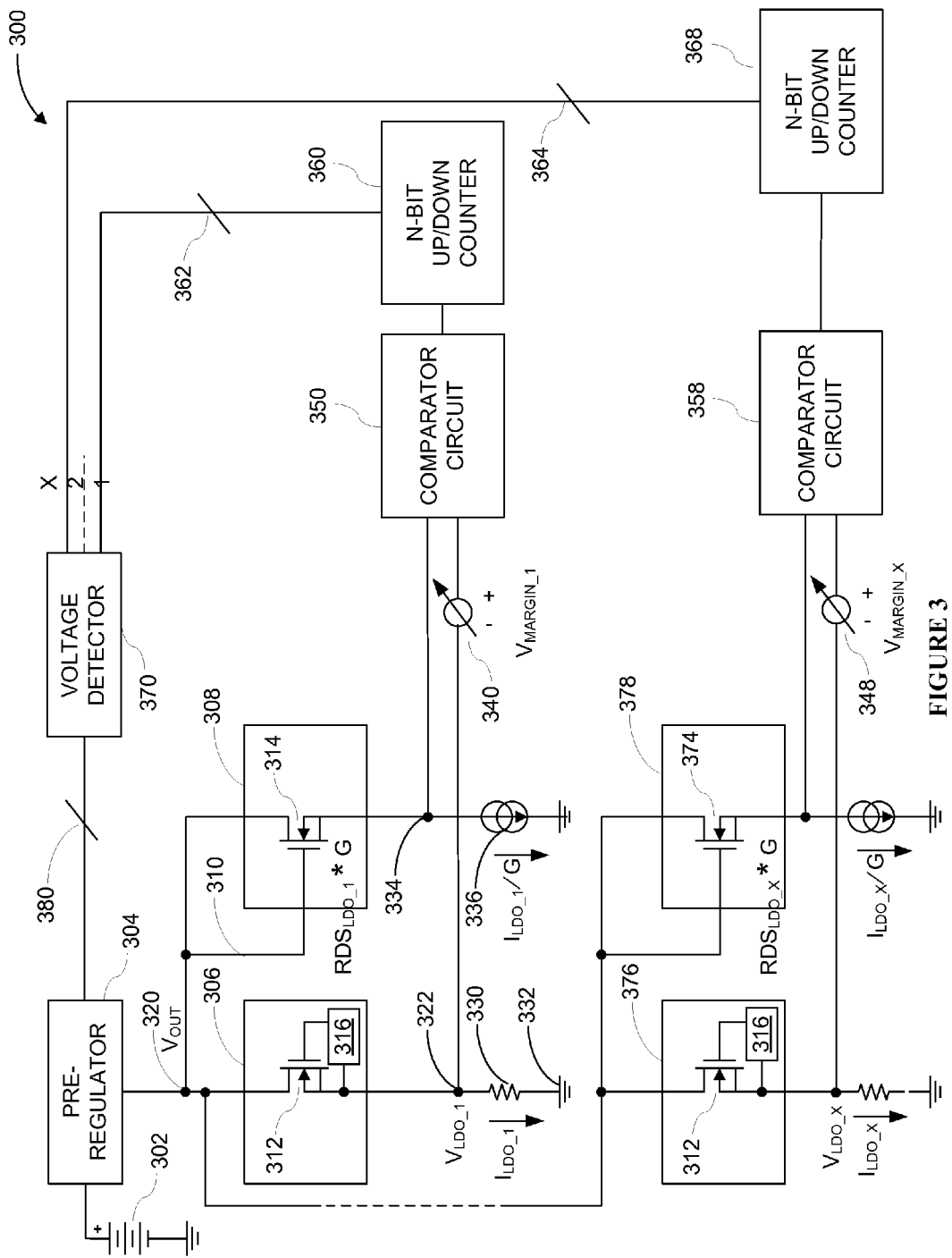
FIG. 3 illustrates an adaptive headroom control system utilizing a combination of analog, digital circuitry, and/or software control, according to various environment of the invention.

FIG. 3 illustrates an adaptive headroom control system utilizing a combination of analog and digital circuitry, and/or software control, according to various environment of the invention. System 300 comprises battery 302, pre-regulator 304, linear sub-regulator 306, duplicate linear switch 308, which may be any saturating device, load 330, counter 360, scaling circuit 336, adjustable margin voltage source 340 comparator circuit 350, counter 360, and voltage detector 370. In this example, pre-regulator 304 is a Buck converter that receives a DC voltage from battery 302 and converts it into output voltage 320 that is different from the battery voltage. Linear sub-regulator 306 is a low voltage regulator, such as a low drop-out regulator (LDO). LDO 306 receives output voltage 320 and converts it to a lower output voltage 322. LDO 306 comprises power FET 312 and control circuitry 316. Circuit 316 controls power FET 312 by modulating its gate voltage so as to maintain a given output voltage $V_{LDO\_1}$ 322 that drives time-varying load 330.

The output of linear switch 308 is coupled to ground via scaling circuit, represented by current sink 336. The output of LDO 306 is increased, via variable margin voltage source 340, and forwarded to comparator circuit 350. Margin voltage source 340 may be a programmable voltage source configured to generate a headroom voltage. Counter 360, which in this example is a digital N-bit up/down counter, is coupled between comparator circuit 350 and voltage detector 370.

In operation, pre-regulator 304 converts battery voltage 302 into a lower pre-regulator output voltage 320 and outputs it to LDO 306. LDO 306, in turn, converts pre-regulator voltage 320 into an even lower output voltage 322 that drives load 330. Duplicate device 308, converts pre-regulator output voltage 320 into LDO output voltage 334 which replicates pre-regulator output voltage 320 minus a minimum headroom voltage. The current through duplicate device 308 is a scaled down version of the current through LDO 306 that drives a duplicate, but scaled-down output load version of the output load current $I_{LDO\_1}$ through load 330. The scaled current, $I_{LDO\_1}/G$, through the scaled switch resistance, $RDS_{LDO\_1}*G$, determines the required minimum headroom of LDO 306. Close physical proximity of LDO 306 and duplicate device 308 aids in ensuring that both circuit components share the same operating temperature. Programmable margin voltage source 340 selectively adds headroom voltage, i.e., operating margin, to the minimum headroom voltage. The programmable margin aids in maintaining the regulation of LDO 306 under all operating conditions. Under steady state conditions, the input ports of comparator 350 receive equal signals. Therefore, the minimum headroom voltage for LDO 306 is defined by equation:

$$V_{HEADROOM\_1} = V_{OUT} - (RDS_{LDO\_1}*G)*(I_{LDO\_1}/G)$$
$$= V_{OUT} - RDS_{LDO\_1}*I_{LDO\_1} = V_{LDO\_1} + V_{MARGIN\_1}$$

The minimum pre-regulator output voltage is defined by the equation:

$$V_{OUT} = V_{LDO\_1} + V_{MARGIN\_1} + RDS_{LDO\_1}*I_{LDO\_1}$$

Comparator circuit 350 monitors output voltage 334 of duplicate device 308 and converts the difference into a digital value that can be counted by digital N-bit up/down counter 360. In one embodiment, counter 360 comprises circuitry that allows comparator 350 to set a headroom voltage for LDO 306 that accounts for variations in output voltage 322. Comparator detects the output voltage of LDO 306 and, based on programmable margining voltage source 340, causes N-bit up/down counter 360 to count up or down to dynamically determine the headroom voltage. Counter 360, 368 outputs signal 362, 364 representative of the maximum voltage requirement of LDO 306 and 376, respectively.

Voltage detector 370 monitors the outputs of N-bit up/down counters 360, 368 and determines which LDO 306 through 376 has the highest voltage requirement at any moment in time. For example, assuming LDO 306 has the highest headroom requirement in system 300. Once LDO 306 is turned off, this is detected by the control circuit via voltage detector 370, which adjusts the headroom margin by lowering the output voltage of pre-regulator 320 accordingly. In one embodiment, voltage detector 370 comprises a comparator block (not shown) comprising a plurality of comparators to regularly monitor and determine from digital counters 360, 368, and headroom information of each LDO

306, 376, the highest value of voltage signals $V_{MAX\_i}$ 362, 364 at predetermined time intervals. Various physical properties that affect the required headroom margin may be detected and used to adjust the headroom voltage accordingly. Headroom information may be stored and retrieved, e.g., through software, from a storage device (not shown) that may be implemented internal or external to voltage detector 370. Based on output signals of counters 360, 368, voltage detector 370 generates input signal 380 for pre-regulator 304, which adjusts its output voltage 320 accordingly to save energy.

Figure 4:
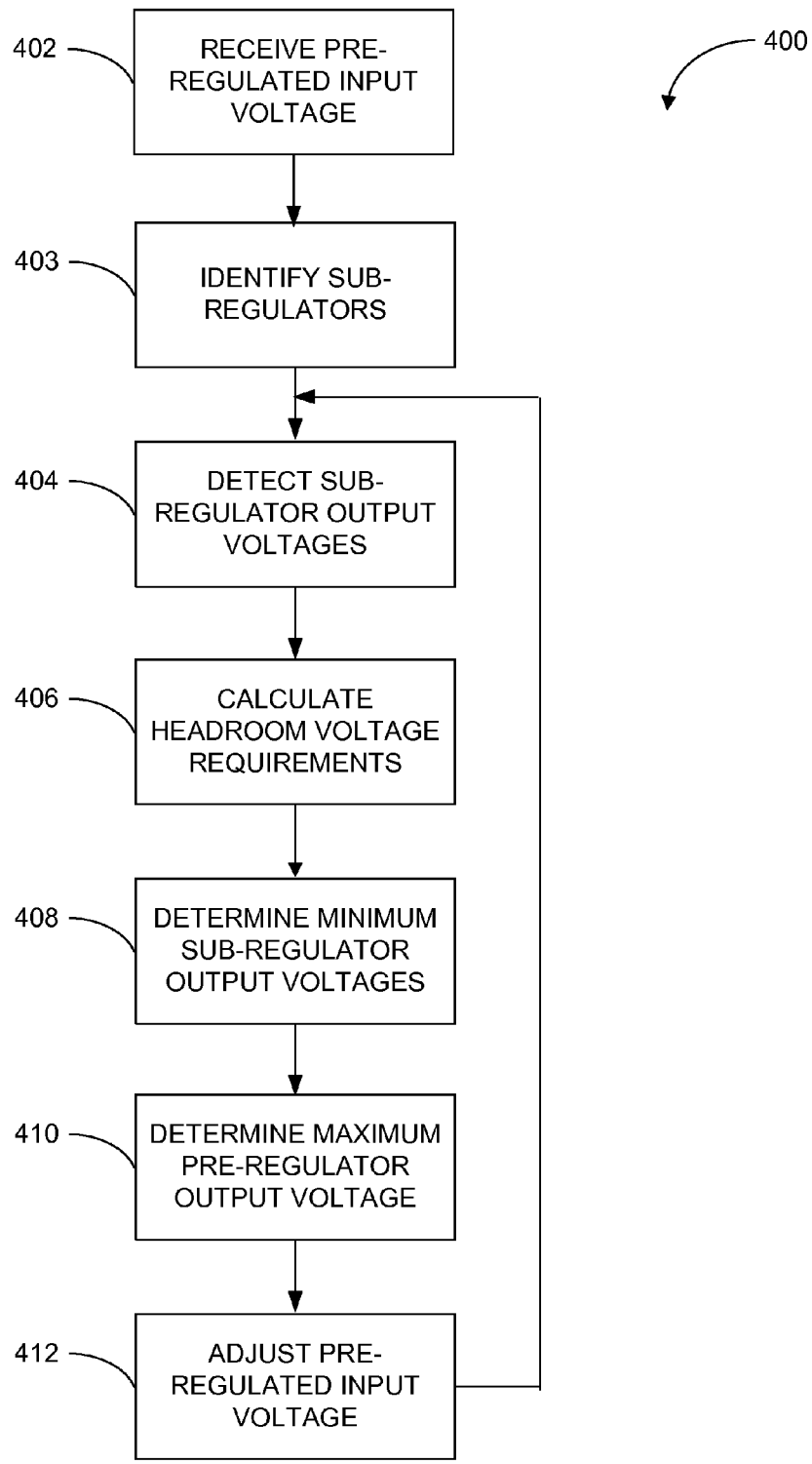
FIG. 4 is a flowchart of an illustrative process for adaptive headroom control in accordance with various embodiments of the invention.

FIG. 4 is a flowchart of an illustrative process for adaptive headroom control in accordance with various embodiments of the invention. The process for adaptive headroom control 400 starts at step 402 when a pre-regulated input voltage is received, for example, directly from the output of a pre-regulator.

At step 403, a plurality of sub-regulators that are coupled to the pre-regulator are identified.

At step 404, one or more sub-regulator output voltages is detected.

At step 406, based on the sub-regulator output voltages, one or more headroom voltage requirements are determined.

At step 408, minimum required sub-regulator output voltages are determined, in part, based on the headroom voltage requirements.

At step 410, a highest required pre-regulator output voltage value is determined based on the minimum required sub-regulator output voltages.

At step 412, the pre-regulated input voltage is adjusted according to the highest required pre-regulator output voltage value, at which that the process may return to step 404 in order to continue to detect sub-regulator output voltages.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. An adaptive headroom controller comprising:
   a pre-regulator;
   a plurality of voltage regulators coupled to receive a pre-regulated input voltage from the pre-regulator;
   a plurality of linear switches coupled to the plurality of voltage regulators, each linear switch generates an output signal representative of an input voltage requirement of a corresponding voltage regulator;
   a margin voltage source coupled to the plurality of linear switches, the margin voltage source selectively generates a first headroom voltage that is related to a variation in one or more operating conditions; and
   a select module coupled to the pre-regulator, the select module receives the output signal to generate a select signal that controls the pre-regulated input voltage in response to varying headroom voltages requirements of the plurality of voltage regulators, thereby, increasing an efficiency of the pre-regulator.

2. The controller according to claim 1, wherein the select signal corresponds to the highest input voltage requirement.

3. The controller according to claim 1, further comprising a comparator coupled to the plurality of linear switches in a feedback configuration, the comparator is configured to detect a second headroom voltage based on an output voltage of the corresponding voltage regulator.

4. The controller according to claim 3, wherein the output signal is associated with the pre-regulated input voltage and the second headroom voltage.

5. The controller according to claim 4, further comprising a counter coupled between the comparator and the select module, the counter outputs counter signals representative of the input voltage requirement of the corresponding voltage regulator.

6. The controller according to claim 5, wherein the select module is a voltage detector comprising a plurality of inputs, the voltage detector generates the select signal in response to receiving the counter signals at the a plurality of inputs.

7. The controller according to claim 1, further comprising scaling circuits coupled to the plurality of linear switches, the scaling circuits generate scaled currents that are duplicate, scaled-down versions of output currents of the plurality of voltage regulators.

8. The controller according to claim 7, wherein the scaled currents determine a second headroom voltage that is a function of at least the output signal.

9. The controller according to claim 1, wherein one or more of the plurality of regulators are configured to operate as a load switch.

10. A method to maximize efficiency in linear regulators, the method comprising:
    receiving a pre-regulated input voltage from a pre-regulator;
    detecting a plurality of regulator output voltages;
    determining one or more headroom voltages that account for variations of the regulator output voltages at regular operation;
    determining a plurality of minimum required regulator output voltages based on the one or more headroom voltages;
    selectively generating a first headroom voltage related to a variation in one or more operating conditions;
    determining a control voltage that is representative of a maximum of the plurality of minimum required regulator output voltages; and
    adjusting the pre-regulated input voltage based on the control voltage.

11. The method according to claim 10, further comprising determining and updating a maximum pre-regulated input voltage requirement for each of a plurality of regulators.

12. The method according to claim 11, further comprising operating one or more of the plurality of regulators as a load switch.

13. The method according to claim 10, wherein the maximum of the plurality of minimum required regulator output voltages is equal to a sum of the pre-regulated input voltage and a highest of the one or more headroom voltages.

14. The method according to claim 10, wherein determining the one or more headroom voltages comprises determining one of a load variation and a temperature variation.

15. An adaptive headroom control system, the system comprising:
    a power supply that provides a system input voltage;

a pre-regulator coupled to receive the system input voltage form the power supply, the pre-regulator converts the system input voltage into a pre-regulated input voltage that is different from the system input voltage;

voltage regulators coupled to receive the pre-regulated input voltage and convert the pre-regulated input voltage into regulator output voltages;

one or more loads coupled to the voltage regulators;

a margin voltage source coupled to a plurality of linear switches to selectively generates a headroom voltage that is related to a variation in one or more operating conditions; and a control circuit coupled to receive one or more control signals from the voltage regulators, the control circuit generates a select signal corresponding to the one or more control signals and controls the pre-regulator in response to varying headroom voltages requirements of the voltage regulators, thereby, increasing the efficiency of the pre-regulator.

16. The system according to claim 15, wherein the voltage regulators comprise current regulating transistors that regulate a current flow through one or more loads in response to the pre-regulator generating the pre-regulated input voltage with a minimum system input voltage.

17. The system according to claim 15, wherein the control circuit comprises a memory device that stores a headroom information.

18. The system according to claim 15, wherein the control circuit comprises saturating devices coupled to corresponding voltage regulators, each saturating device generates an output signal representative of an input voltage requirement of a corresponding voltage regulator.

19. The system according to claim 15, wherein the power supply comprises one of a switching power supply and a linear power supply.

* * * * *